(12) United States Patent
Egger

(10) Patent No.: US 11,256,580 B2
(45) Date of Patent: Feb. 22, 2022

(54) CIRCUIT FOR DETECTING SYSTEMATIC AND RANDOM FAULTS

(71) Applicants: Continental Automotive France, Toulouse (FR); Continental Automotive GmbH, Hannover (DE)

(72) Inventor: Vincent Egger, Bouloc (FR)

(73) Assignees: Continental Automotive France; Continental Automotive GmbH

( * ) Notice: Subject to any disclaimer, the term of this patent is extended or adjusted under 35 U.S.C. 154(b) by 184 days.

(21) Appl. No.: 16/307,287

(22) PCT Filed: Jun. 2, 2017

(86) PCT No.: PCT/FR2017/051398
§ 371 (c)(1),
(2) Date: Dec. 5, 2018

(87) PCT Pub. No.: WO2017/212152
PCT Pub. Date: Dec. 14, 2017

(65) Prior Publication Data
US 2019/0138406 A1    May 9, 2019

(30) Foreign Application Priority Data
Jun. 8, 2016   (FR) ...................................... 1655245

(51) Int. Cl.
*G06F 11/16* (2006.01)
*G06F 11/07* (2006.01)
(Continued)

(52) U.S. Cl.
CPC ...... *G06F 11/1637* (2013.01); *G06F 11/0724* (2013.01); *G06F 11/0739* (2013.01);
(Continued)

(58) Field of Classification Search
CPC ............. G06F 11/0724; G06F 11/0739; G06F 11/0757; G06F 11/0793; G06F 11/0796;
(Continued)

(56) References Cited

U.S. PATENT DOCUMENTS 6,654,905 B1 * 11/2003 Dickens .............. G06F 11/0757
714/10
6,654,908 B1    11/2003 Arndt
(Continued)

FOREIGN PATENT DOCUMENTS

CN      101910856 A      12/2010
CN      104228589 A  *   12/2014
(Continued)

OTHER PUBLICATIONS

International Search Report and Written Opinion for International Application No. PCT/FR2017/051398, dated August 8, 2017—11 pages.
(Continued)

*Primary Examiner* — Bryce P Bonzo
*Assistant Examiner* — Michael Xu
(74) *Attorney, Agent, or Firm* — RatnerPrestia

(57) ABSTRACT

A failure detection circuit for a motor vehicle electronic computer, including: a main microcontroller having at least two microcontroller cores configured to execute the same instructions in parallel, and at least one first software module providing a critical function of a motor vehicle. The first software module includes a predetermined input point and a predetermined output point a supervision microcontroller and a synchronous communication interface for coupling the main microcontroller and the supervision microcontroller so as to enable mutual supervision. The detection circuit makes it possible to detect systematic and random failures.

12 Claims, 3 Drawing Sheets

(51) Int. Cl.
*G06F 11/28* (2006.01)
*G06F 21/54* (2013.01)

(52) U.S. Cl.
CPC ...... *G06F 11/0757* (2013.01); *G06F 11/0793* (2013.01); *G06F 11/0796* (2013.01); *G06F 11/28* (2013.01); *G06F 21/54* (2013.01)

(58) Field of Classification Search
CPC ...... G06F 11/1637; G06F 11/28; G06F 21/54; G06F 11/0751
See application file for complete search history.

(56) References Cited

U.S. PATENT DOCUMENTS

| | | | |
|---|---|---|---|
| 10,970,154 B2* | 4/2021 | Grimm | G01R 31/2829 |
| 2009/0024775 A1* | 1/2009 | Costin | G05B 19/0428 |
| | | | 710/107 |
| 2009/0183018 A1 | 7/2009 | Nakamura et al. | |
| 2010/0295568 A1 | 11/2010 | Ostrovsky | |
| 2012/0023389 A1* | 1/2012 | Brewerton | G06F 11/1679 |
| | | | 714/820 |
| 2014/0115401 A1* | 4/2014 | Ito | G06F 11/1695 |
| | | | 714/37 |
| 2014/0223238 A1 | 8/2014 | Allen | |
| 2014/0365814 A1 | 12/2014 | Chillie et al. | |

FOREIGN PATENT DOCUMENTS

| | | | | |
|---|---|---|---|---|
| DE | 102008033675 A1 * | 2/2009 | | G06F 11/2236 |
| DE | 102008033675 A1 | 2/2009 | | |
| EP | 1063591 A2 | 12/2000 | | |
| EP | 2685379 A1 | 1/2014 | | |
| GB | 2379527 A * | 3/2003 | | G06F 11/0757 |
| GB | 2379527 A | 3/2003 | | |

OTHER PUBLICATIONS

Chinese Office Action for Chinese Application No. 201780048358.3, dated Sep. 3, 2021 with translation, 20 pages.

* cited by examiner

CIRCUIT FOR DETECTING SYSTEMATIC AND RANDOM FAULTS

CROSS REFERENCE TO RELATED APPLICATIONS

This application is the U.S. National Phase Application of PCT International Application No. PCT/FR2017/051398, filed Jun. 2, 2017, which claims priority to French Patent Application No. 1655245, filed Jun. 8, 2016, the contents of such applications being incorporated by reference herein.

FIELD OF THE INVENTION

The invention relates to the field of motor vehicles and more particularly to a failure detection circuit for an electronic computer.

The invention also pertains to an electronic computer comprising the detection circuit.

BACKGROUND OF THE INVENTION

The development of electronic computers in the motor vehicle sector has to take into consideration numerous functional safety constraints, such as those stipulated by the ISO 26 262 standard.

In the framework of this standard, it is necessary in particular to be able to detect what are called systematic failures that are linked to development errors in the software modules of computers (for example blocking of the execution of a function, erasure of part of a memory space).

The requirements of this standard apply particularly to electronic computers involved in implementing what are called critical functions of a motor vehicle, such as the ABS, ESP, EPS, EPB or airbag functions.

To meet these requirements, patent application EP 2 685 379 A1, which is incorporated by reference, proposes to integrate, into the electronic computers, a main microcontroller and a supervision microcontroller that are designed to supervise one another via a bus-type communication interface. This layout makes it possible to detect numerous failures of the critical functions of a motor vehicle.

However, document EP 2 685 379 A1 does not contemplate the configuration in which the main microcontroller comprises at least two microcontroller cores that are designed to execute the same instructions in parallel.

In this scenario, systematic failures are not able to be detected by the supervision microcontroller, as the two cores of the main microcontroller will execute the same software code and therefore produce the same results. The supervision microcontroller is therefore not able to deduce a failure linked to the execution of the software on the basis of the identical results produced by the two microcontroller cores.

Furthermore, what are called common-cause random failures are not able to be detected by the supervision microcontroller either. Common-cause random failures stem from a fault common to at least two redundant elements of the electronic computer, such as the microcontroller cores, the power supplies or the clocks. For example, when the main microcontroller comprises two peripherals, such as analog-to-digital converters (called ADCs hereinafter), the detection of a failure of the ADCs is able to be deduced by comparing the results produced by each of the ADCs. Now, generally speaking, the two ADCs, just like the two cores, have the same power supply, are supplied by the same clock, and often form part of the same module. It may then be the case that a fault common to the two ADCs, or to the two cores, may occur such that the results from the ADCs are not able to be utilized to detect a possible failure. Specifically, there may very possibly be a failure caused by a power supply fault and/or clock fault or a fault resulting from an electrostatic discharge (ESD) from the module comprising the ADCs and the cores. The supervision microcontroller is therefore not able to deduce a common-cause random failure on the basis of the results produced by the two peripherals.

This is unacceptable for the application under consideration, as numerous critical failures are not detected.

SUMMARY OF THE INVENTION

In this respect, what is proposed is a circuit for detecting failures of a main microcontroller comprising at least two microcontroller cores that are designed to execute the same instructions in parallel.

To this end, a first aspect of the invention proposes a failure detection circuit for a motor vehicle electronic computer. The circuit comprises:
  a main microcontroller comprising
    at least two microcontroller cores configured to execute the same instructions in parallel, and
    at least one first software module providing a critical function of a motor vehicle, the first software module comprising a predetermined input point and a predetermined output point,
  a supervision microcontroller, and
  a synchronous communication interface for coupling the main microcontroller and the supervision microcontroller so as to enable mutual supervision.
Furthermore, the circuit is noteworthy in that:
  the supervision microcontroller is configured to supply the main microcontroller with a first initialization value and a second initialization value;
  the main microcontroller is configured, in response to the execution of the first software module, to:
    determine a first input point value at the predetermined input point of the first software module, on the basis of the first initialization value and of an execution start value indicative of a start of execution of a software module of the main microcontroller;
    determine a first output point value at the predetermined output point of the first software module, on the basis of the second initialization value and of an execution end value and indicative of an end of execution of a software module of the main microcontroller;
    determine a first result value of a predetermined calculation on the basis of the first input point value and of the first output point value; and
    supply the supervision microcontroller with the first result value.
  the supervision microcontroller is equipped with comparison means for performing a first comparison between the first result value and a predetermined first result value of the predetermined calculation, such that the supervision microcontroller is able to detect a failure of the main microcontroller in response to the first comparison.

This has the advantage of being able to detect systematic and random failures of a dual-core microcontroller, and to do so in order to comply with the ISO 26 262 standard.

In a first implementation, the predetermined calculation is an at least second-order polynomial calculation. This is done in order to ensure that both microcontroller cores are capable of performing correct calculations.

In a second implementation:

the main microcontroller comprises a second software module providing a critical function of the motor vehicle, the second software module comprising a predetermined input point and a predetermined output point, the main microcontroller is furthermore configured, in response to the execution of the second software module, to:

determine a second input point value at the predetermined input point of the second software module, on the basis of the first input point value and of the execution start value, determine a second output point value at the predetermined output point of the second software module, on the basis of the first output point value and of the execution end value, determine a second result value of the predetermined calculation on the basis of the second input point value and of the second output point value; and supply the supervision microcontroller with the second result value.

the comparison means of the supervision microcontroller are furthermore configured to perform a second comparison between the second result value and a predetermined second result value of the predetermined calculation, such that the supervision microcontroller is able to detect a failure of the main microcontroller in response to the second comparison.

This implementation makes it possible to detect a failure in the execution of a chain of critical functions.

In a third implementation:

the supervision microcontroller is equipped with measurement means for measuring a time that has elapsed between the supplying of the main microcontroller with the first and second initialization values and the reception of a result value, and the comparison means of the supervision microcontroller are furthermore configured to perform a third comparison between the OUTWARD-RETURN time and a predetermined OUTWARD-RETURN time, such that the supervision microcontroller is able to detect a failure of the main microcontroller in response to the third comparison.

In a fourth implementation:

the main microcontroller is equipped with measurement means for measuring an execution period of one or of several software modules of the main microcontroller, and the comparison means of the supervision microcontroller are furthermore configured to perform a fourth comparison between the measurement of the execution period transmitted to the supervision microcontroller and a predetermined execution period, such that the supervision microcontroller is able to detect a failure of the main microcontroller in response to the fourth comparison.

In a fifth implementation:

the main microcontroller and the supervision microcontroller each independently comprise an operating clock, the supervision microcontroller is furthermore equipped with clock generation means for generating an operating clock of the communication interface on the basis of the operating clock and of a predetermined operating clock value, and the main microcontroller is furthermore equipped:

with measurement means for measuring the clock of the communication interface, and with comparison means for performing a fifth comparison between a measurement of the operating clock of the communication interface by the measurement means and the predetermined operating clock value, such that the main microcontroller is able to detect a failure of the supervision microcontroller in response to the fifth comparison.

In a sixth implementation:

the main microcontroller is furthermore equipped with means for periodically generating an initialization signal indicative of the initialization of communication via the communication interface on the basis of a predetermined periodicity value, and the supervision microcontroller is furthermore equipped with measurement means for measuring the periodicity of the initialization signal, the comparison means of the supervision microcontroller are furthermore configured to perform a sixth comparison between a measurement of the periodicity of the reception of the initialization signal by the measurement means and the predetermined periodicity value, such that the supervision microcontroller is able to detect a failure of the main microcontroller in response to the sixth comparison.

In a seventh implementation:

the main microcontroller comprises a first power supply unit and the supervision microcontroller comprises a second power supply unit, the first and the second power supply units are physically independent from one another, the main microcontroller and the supervision microcontroller each independently comprise voltage measurement means, the main microcontroller is coupled to the second power supply unit and the comparison means of the main microcontroller are furthermore configured to perform a seventh comparison between a measurement of the operating voltage of the second power supply unit by the measurement means and a predetermined first operating voltage range, such that the main microcontroller is able to detect a failure of the supervision microcontroller in response to the seventh comparison, and the supervision microcontroller is coupled to the first power supply unit and the comparison means of the supervision microcontroller are furthermore configured to perform an eighth comparison between a measurement of the operating voltage of the first power supply unit by the measurement means and a predetermined second operating voltage range, such that the supervision microcontroller is able to detect a failure of the main microcontroller in response to the eighth comparison.

In an eighth implementation:

an actuator interface is coupled to the main microcontroller and to the supervision microcontroller, the actuator interface is configured to send an actuation signal to an actuator intended to be connected to the detection circuit, the main microcontroller and the supervision microcontroller each independently comprise an analog-to-digital converter configured to receive the same actuation signal, and the comparison means of the supervision microcontroller are furthermore configured to perform a ninth comparison between the digital conversion values obtained from the analog-to-digital converter of the main microcontroller and the digital conversion value from the analog-to-digital converter of the supervision microcontroller, such that the supervision microcontroller is able to detect a failure of the main microcontroller in response to the ninth comparison.

In a second aspect, the invention also relates to an electronic control module or ECU (for engine control unit), intended to detect failures of at least one critical function of a motor vehicle. The electronic control module comprises a circuit according to the first aspect coupled to a sensor and to an actuator for the critical function of the vehicle.

BRIEF DESCRIPTION OF THE DRAWINGS

Other features and advantages of aspects of the invention will become more apparent upon reading the description that will follow. This description is purely illustrative and should be read with reference to the appended drawings, in which.

In these figures, identical or similar references from one figure to another denote identical or analogous elements. For the sake of clarity, the elements shown are not to scale in relation to one another, unless indicated otherwise.

DETAILED DESCRIPTION OF THE PREFERRED EMBODIMENTS

Figure 1:
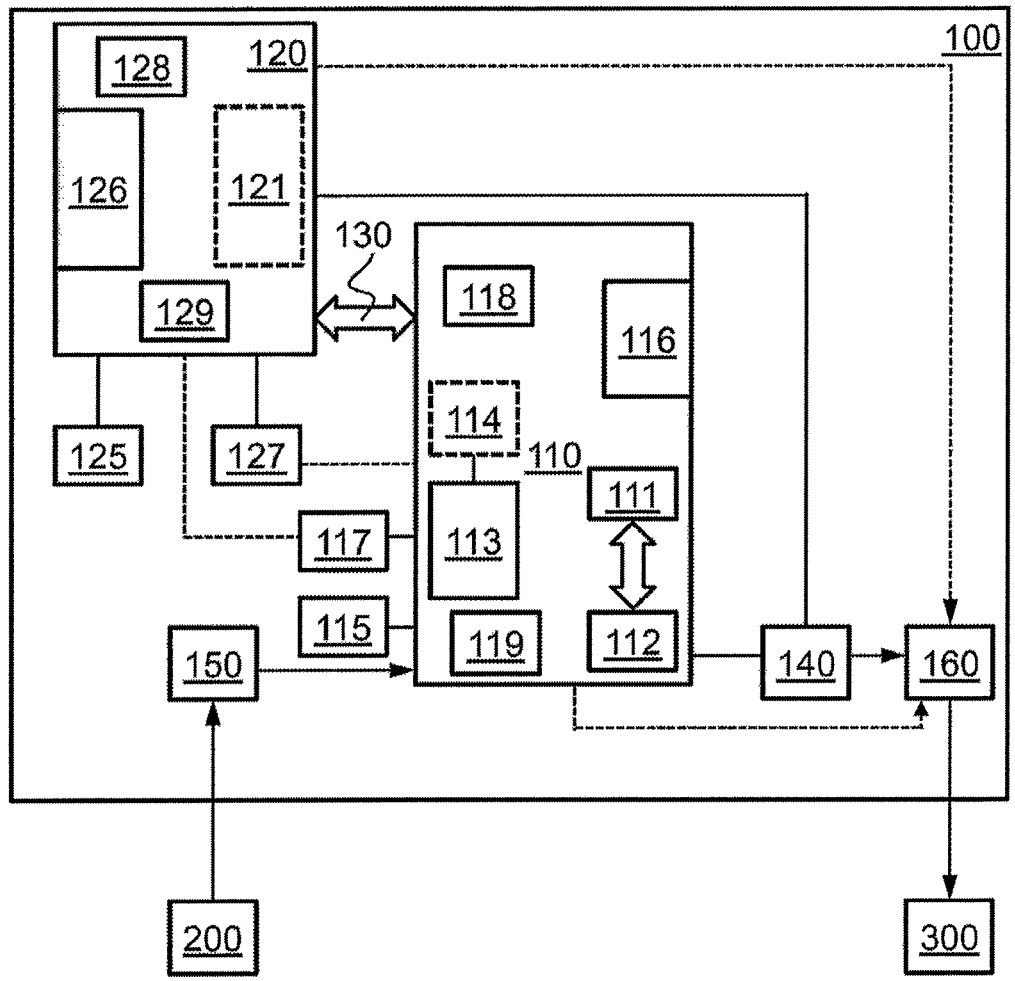
FIG. 1 is a schematic depiction of a failure detection circuit for a motor vehicle electronic computer according to an aspect of the invention.

FIG. 1 schematically shows a failure detection circuit 100, according to an aspect of the invention, for an electronic computer (not shown) of a motor vehicle (not shown).

As illustrated by FIG. 1, the circuit 100 comprises at least one main microcontroller 110, a supervision microcontroller 120 and a communication interface 130.

The main microcontroller 110 comprises two microcontroller cores 111 and 112, configured to execute, in parallel, software instructions supplied to the main microcontroller 110. More precisely, during operation, one and the same instruction is executed in parallel by both microcontroller cores 111 and 112. However, the use of three, four, five or more microcontroller cores is also contemplated, without this requiring any significant modification of the operation of an aspect of the invention. The main microcontroller 110 also comprises at least one software module 113 that makes it possible to ensure implementation of a critical function of the motor vehicle. In the remainder of this description, the use of the expression "critical function" will have to be understood to denote a motor vehicle function whose failure may cause physical harm to the driver of the vehicle. For example, the wheel anti-locking system (ABS) and the power steering computer system (EPS) are considered to be critical functions of the motor vehicle that may be fully or partly implemented via software. Specifically, a critical function should be understood as being able to be implemented not only completely by software, but also partly by software and partly by one or more electronic and/or mechanical elements of the circuit 100. However, it will be noted that one or more critical functions may be implemented by the same software module, such as the software module 113.

The software module 113 comprises a predetermined input point Pin and a predetermined output point Sout. Generally speaking, these points should be situated in the source code of the software module 113, such as markers, such that it is possible to determine a start of execution and an end of execution, respectively, of the software module 113. For example, the predetermined input point Pin of the software module 113 may be situated at a function executed by a periodic task, whereas the predetermined output point Sout may be situated at a function executed by another periodic task or by another subassembly of the software module 113. In this example, a periodic task may be executed by the operating system of the main microcontroller 110.

The supervision microcontroller 120 may have a configuration different from that of the main microcontroller 110. For example, in one particular implementation, the supervision microcontroller 120 comprises a single microcontroller core (not shown). However, as required, the main microcontroller 110 and the supervision microcontroller 120 may have the same technical features. Furthermore, the supervision microcontroller 120 is equipped with comparison means 129 for comparing at least two values. Lastly, the supervision microcontroller 120 comprises a memory 128 for storing one or more values. In the context of an aspect of the invention, the supervision microcontroller 120 knows the order of execution of a plurality of software modules of the main microcontroller 110. Thus, the supervision microcontroller 120 knows the recurrence and the order in which each of the software modules of the main microcontroller 110 should be executed.

The communication interface 130 is synchronous and is designed to couple the main microcontroller 110 and the supervision microcontroller 120 so as to enable mutual supervision. For example, the communication interface 130 may be a serial communication bus in accordance with one of the following standards: I2C ("Inter-Integrated Circuit"), RS232 or SPI ("Serial Peripheral Interface"). Other communication interfaces having a synchronous aspect may nevertheless also be contemplated.

Figure 2:
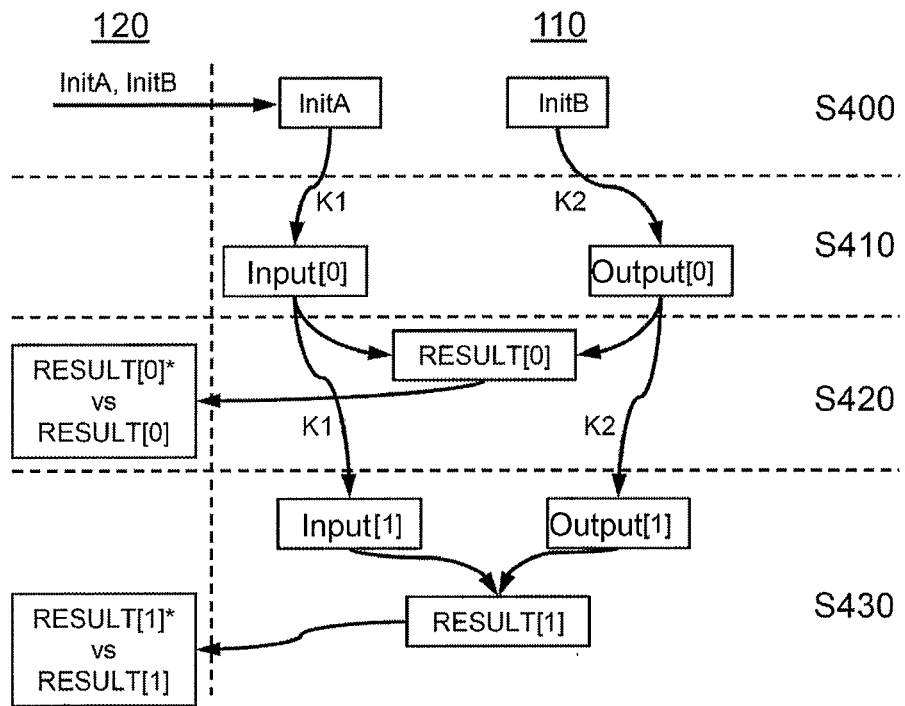
FIG. 2 is a flow chart of one embodiment according to an aspect of the invention.

FIG. 2 schematically depicts a flow chart of one embodiment according to an aspect of the invention.

In step S400, the supervision microcontroller 120 supplies the main microcontroller 110, via the communication interface 130, with a first initialization value InitA and a second initialization value InitB. For example, these are integers stored beforehand in the memory 128. In one particular implementation, these initialization values have a value between 0 and 255. In another particular implementation, the initialization values are modified with a predetermined periodicity.

Step S410 is performed when the software module 113 is executed in order to implement one or more corresponding critical functions. In this context, the main microcontroller 110 determines an input point value Input[0] at the predetermined input point Pin of the software module 113, on the basis of the first initialization value InitA and of an execution start value K1. This execution start value K1 makes it possible to determine whether the predetermined input point Pin of the software module has been crossed when this software module is executed. The execution start value K1 is predetermined and known to the supervision microcontroller 120 and to the main microcontroller 110. In one implementation, the execution start value K1 is a constant value, whereas, in another implementation, it is a value specific to each software module able to be executed by the main microcontroller 110. In one example, the input point value Input[0] is equal to the sum of the first initialization value InitA and the execution start value K1. However, other formulae for determining the input point value Input[0] may be contemplated, insofar as the formula that is used is known to the supervision microcontroller 120 and to the main microcontroller 110.

Next, still in step S410, the main microcontroller 110 determines an output point value Output[0] at the predetermined output point Sout of the software module 113, on the basis of the second initialization value InitB and of an execution end value K2. The execution end value K2 makes it possible to determine whether the predetermined output point Sout of the software module has been crossed when this software module is executed. The execution end value K2 is predetermined and known to the supervision microcontroller 120 and to the main microcontroller 110. Like for the execution start value K1, the execution end value K2 may have a constant value or a value specific to each software module able to be executed by the main microcontroller 110. In one example, the output point value Output[0] is equal to the sum of the square of the execution end value K2 and the second initialization value initB. However, other formulae for determining the output point value Output[0] may be contemplated, insofar as the formula that is used is known to the supervision microcontroller 120 and to the main microcontroller 110.

In step S420, the main microcontroller 110 determines a result value RESULT[0] of a predetermined calculation on the basis of the input point value Input[0] and of the output point value Output[0]. In one example, the result value RESULT[0] is equal to the sum of the input point value Input[0] and the square of the output point value Output[0]. However, other formulae for determining the result value RESULT[0] may be contemplated, insofar as the formula that is used in the predetermined calculation is known to the supervision microcontroller 120 and to the main microcontroller 110. For example, in one particular implementation, the predetermined calculation is an at least second-order polynomial calculation. Next, still in step S420, the main microcontroller 110 supplies the supervision microcontroller 120 with the result value RESULT[0] via the communication interface 130.

Lastly, still in step S420, the supervision microcontroller 120 compares the result value RESULT[0] with a predetermined result value RESULT[0]* of the predetermined calculation, by virtue of the comparison means 129. The predetermined result value RESULT[0]* may be calculated on the fly by the supervision microcontroller 120 on the basis of the initialization values, of the execution values and of the knowledge of the order of the software modules executed by the main microcontroller 110. Moreover, the predetermined result value RESULT[0]* may have been calculated beforehand and then stored in the memory 128.

On the basis of the result of the comparison, the supervision microcontroller 120 is capable of detecting a failure of the main microcontroller 110. Specifically, as the supervision microcontroller 120 knows all of the parameters for obtaining the result value RESULT[0], it is therefore able to determine whether the result obtained corresponds to the expected result. Thus, if the result value RESULT[0] is different from the predetermined result value RESULT[0]*, then the supervision microcontroller 120 is able to deduce from this that at least one failure has occurred in the main microcontroller 110. By contrast, if the result value RESULT[0] is equal to the predetermined result value RESULT[0]*, then the supervision microcontroller 120 is able to deduce from this that no failure has occurred in the main microcontroller 110.

The mechanism according to an aspect of the invention makes it possible to check that the execution cycle of a software module of the main microcontroller 110 has been complied with, as the result value RESULT[0] is obtained by making a link between the start and the end of the execution of the software modules. Specifically, according to the example of FIG. 2, if the software module 113 has not started its execution, then the execution start value K1 will not be used to determine the input point value Input[0], thus leading to an erroneous value of the result formed by the result value RESULT[0]. The same will apply if the software module 113 has not started its execution, as the execution end value K2 will not be used to determine the output point value Output[0]. Furthermore, if the software module 113 is executed more times than intended (for example twice instead of once), this will also lead to an erroneous value of the result formed by the result value RESULT[0], as the execution start value K1 and/or execution end value K2 will be taken into account several times in order to determine the input point value Input[0] and output point value Output[0], respectively. In this way, systematic failures are able to be detected. It is also possible to detect common-cause fault failures with the microcontroller cores 111 and 112 in the capacity of calculating units. Specifically, the complexity of the predetermined calculation of the result value makes it possible to ensure that the microcontroller cores 111 and 112 are capable of performing correct calculations. Specifically, if a common-cause failure occurs in the microcontroller cores 111 and 112 (for example if the microcontroller cores come from one and the same defective production series), an erroneous value will be obtained for the result value RESULT[0]. Furthermore, it may be noted that the execution of a critical function by the main microcontroller 110 may implement peripherals intrinsic to the main microcontroller 110, such as the automatic memory transfer mechanism (DMA—direct memory access), the interrupt controller, or else the timing events manager (timer). The failure of at least one of these peripherals may lead to an erroneous result for the result value RESULT[0]. Thus, performing the predetermined calculation also enables detection of the failure of these peripherals by the supervision microcontroller 120.

It will be noted that deducing the presence of at least one failure in the main microcontroller 110 makes it possible primarily to identify a failure, but not necessarily the source thereof. However, as the motor vehicle functions under surveillance are critical functions, it is first of all important to be able to detect the presence of the largest possible number of failures before being able to identify the source thereof. Thus, knowing that a critical function of a motor vehicle is defective makes it possible to take appropriate safety measures as quickly as possible.

In one particular implementation, the supervision microcontroller 120 is able to detect a failure of the main microcontroller 110 when the latter does not supply the result value RESULT[0] within a predetermined time. In this implementation, the supervision microcontroller 120 is equipped with measurement means (not shown) for measuring a time that has elapsed between the supplying of the main microcontroller 110 with the first and second initialization values InitA and InitB and the reception of the result value RESULT[0]. This elapsed time will be called the "outward-return time" hereinafter. With this layout, the comparison means 129 of the supervision microcontroller 120 make it possible to deduce a failure of the main microcontroller 110 when the "outward-return time" measured by the supervision microcontroller 120 is different from a predetermined "outward-return time" known to the supervision microcontroller 120 or is not within a predetermined time interval around the predetermined "outward-return time". In one example, the predetermined "outward-return time" is stored in the memory 128 of the supervision microcontroller 120.

In one alternative that is compatible with the previous implementation, the main microcontroller 110 is equipped with measurement means (not shown) for measuring the execution period of the software module 113, that is to say the time required to execute the software module 113. In this context, following the execution of the software module, the measurement of the execution period is sent to the supervision microcontroller 120 via the communication interface 130. In this particular layout, the supervision microcontroller 120 is able to detect a failure of the main microcontroller 110 when the measured execution period of the software module 113 is different from a predetermined execution period of the software module 113 known to the supervision microcontroller 120 or is not within a predetermined time interval around the predetermined execution period. In one example, the predetermined execution period is stored in the memory 128 of the supervision microcontroller 120.

In this implementation, the predetermined "outward-return time" and the predetermined execution period of the software module 113 may have been determined in phases of testing the circuit 100.

In another particular implementation of the detection circuit 100, the main microcontroller 110 comprises a plurality of software modules. In this context, each of the software modules of the plurality of software modules provides a critical function of the motor vehicle. Furthermore, the plurality of software modules is executed sequentially. In other words, the software modules of the plurality of software modules are "chained", such that the execution of a second software module follows on from the end of the execution of a first software module of the plurality of software modules. In the example of FIG. 1, the main microcontroller 110 comprises a second software module 114 in addition to the software module 113.

Returning to FIG. 2, in step S430, the main microcontroller 110 determines an input point value Input[1] at the predetermined input point Pin of the software module 114, on the basis of the input point value Input[0] and of the execution start value K1. Next, the main microcontroller 110 determines an output point value Output[1] at the predetermined output point Sout of the software module 114, on the basis of the output point value Output[0] and of the execution end value K2. Thereafter, still in step S430, the main microcontroller 110 determines a result value RESULT[1] of a predetermined calculation on the basis of the input point value Input[1] and of the output point value Output[1]. The determination of the input point value Input[1], output point value Output[1] and result value RESULT[1] is similar to the determination of the input point value Input[0], output point value Output[0] and result value RESULT[0], as explained above. In the same way, the result value RESULT [1] is sent by the main microcontroller 110, via the communication interface 130, to the supervision microcontroller 120 so as to be compared therein with the predetermined result value RESULT[1]*, such that a failure of the main microcontroller 110 is able to be detected. In one example, only the result value RESULT[1] is sent to the supervision microcontroller 120. In this case, only the final value of the predetermined calculation will be considered in order to detect a failure of the main microcontroller 110. In another example, the result values RESULT[0] and RESULT[1] are sent to the supervision microcontroller 120. In this case, the result value RESULT[0] is considered to be an intermediate value of the predetermined calculation that is able to assist in identifying the location where a given failure has occurred. Specifically, if the result value RESULT[0] corresponds to the expected result value RESULT[0]*, then the supervision microcontroller 120 is able to deduce from this that the software module 113 has executed without any error. By contrast, if the result value RESULT[0] is different from the expected result value RESULT[0]*, then the supervision microcontroller 120 is able to deduce from this that the failure has occurred during the execution of the software module 113.

The features presented above, with regard to the possibility of detecting a failure of the main microcontroller 110 when the calculated results are not supplied to the supervision microcontroller 120 within a predetermined time or in a predetermined execution time, are also contemplated for this implementation.

According to another embodiment of the circuit 100, there is provision for the supervision microcontroller 120 furthermore to be configured to send, to the main microcontroller 110, a signal to reset the main microcontroller 110, in response to the detection of a failure of the main microcontroller 110, and to do so in order to attempt to reset the main microcontroller 110 or the software module(s) at the origin of the failure. In the context of this embodiment of the circuit 100, there is also provision for the supervision microcontroller 120 furthermore to be configured to prevent resetting of the main microcontroller 110, in response to the detection of a predetermined number of failures of the main microcontroller 110, and to do so for a predetermined period. For example, when numerous requests to reset the main microcontroller 110 are requested by the supervision microcontroller 120 for a period considered to be short, this means that the critical function provided by the software module 113 is no longer guaranteed. Specifically, a plurality of failures of the main microcontroller 110 that are detected within a limited time interval means that the critical function provided by the software module that is currently executing will not return to a normal operating mode. In this case, it is not necessary to attempt to reset the main microcontroller 110. By contrast, it may be more expedient to completely cut off the critical function(s) that are potentially at the origin of the failure of the system. For example, it may be contemplated to put the motor vehicle into an impaired operating mode, by activating only the vital functions of the motor vehicle. This would allow the driver to be informed that a critical function of the vehicle is no longer functional, and that it is preferable to stop and request technical assistance.

Figure 3:
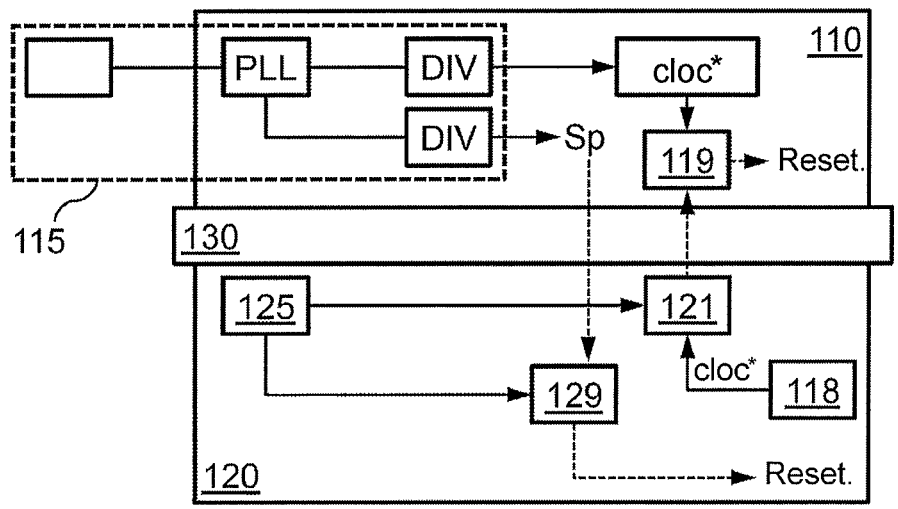
FIG. 3 is a schematic depiction of part of the circuit of FIG. 1, showing a clock control mechanism according to one embodiment of the invention.

FIG. 3 schematically depicts part of the circuit 100 according to one embodiment of an aspect of the invention. In this embodiment, the main microcontroller 110 and the supervision microcontroller 120 each independently comprise an operating clock 115, 125. The main microcontroller 110 is also equipped with clock measurement means (not shown) for measuring the operating clock of the communication interface 130. Furthermore, the supervision microcontroller 120 is equipped with clock generation means 121 for generating an operating clock of the communication interface 130 on the basis of the operating clock 125 of the supervision microcontroller 120 and of a predetermined operating clock value cloc* known to the main microcontroller 110 and to the supervision microcontroller 120. In the example of FIG. 3, the predetermined operating clock value cloc* in the main microcontroller 110 is generated on the basis of a clock 115 external to the main microcontroller 110. In the example of FIG. 3, the external clock 115 of the main microcontroller 110 comprises an external oscillator coupled to a phase-locked loop PLL, which is itself coupled to two frequency dividers DIV. However, in another example, it is also possible to contemplate storing the predetermined operating clock value cloc* in a memory 118 of the main microcontroller 110. Moreover, in the supervision microcontroller 120, the predetermined operating clock value cloc* is stored in the memory 128. In addition, the main microcontroller 110 is equipped with comparison means 119 for performing a comparison between a measurement of the operating clock of the communication interface 130 and the predetermined operating clock value cloc*. With this layout, the result of the comparison allows the main microcontroller 110 to detect a failure of the supervision microcontroller 120 in terms of its capability of generating an operating clock in a reliable manner. Specifically, if the measurement of the operating clock of the communication interface is different from the predetermined operating clock value or is not within a predetermined interval containing the predetermined operating clock value, it is possible to deduce from this that the clock management mechanisms of the supervision microcontroller 120 are defective.

In one particular implementation of FIG. 3, the main microcontroller 110 is equipped with means (not shown) for periodically generating an initialization signal Sp indicative of the initialization of communication via the communication interface 130, and for doing so on the basis of a predetermined periodicity value Sinit* known to the supervision microcontroller 120 and to the main microcontroller 110. In other words, the initialization signal Sp is configured to be sent periodically by the main microcontroller 110 to the supervision microcontroller 120. In the example of FIG. 3, the periodic initialization signal Sp is generated on the basis of the operating clock 115. Furthermore, the supervision microcontroller 120 is provided with measurement means (not shown) for measuring the periodicity of a signal in order to measure the periodicity of the reception of the initialization signal Sp. With this layout, the comparison means 129 of the supervision microcontroller 120 are also configured to perform a comparison between the measurement of the periodicity of the reception of the initialization signal and the predetermined periodicity value Sinit*. In this layout, the result of the comparison allows the supervision microcontroller 120 to detect a failure of the main microcontroller 110 in terms of its capability of generating a signal in a periodic manner.

Returning to FIG. 1, according to another embodiment of the circuit 100, there is provision for the main microcontroller 110 and the supervision microcontroller 120 to each independently comprise a power supply unit 117, 127. In this embodiment, the main microcontroller 110 is coupled to the power supply unit 127 of the supervision microcontroller 120, and the supervision microcontroller 120 is the power supply unit 117 of the main microcontroller 110. Furthermore, there is provision for the main microcontroller 110 and the supervision microcontroller 120 to each independently comprise voltage measurement means (not shown) for measuring the voltage of a power supply unit. With this layout, the comparison means 119 of the main microcontroller 110 are also configured to perform a comparison between a measurement of the operating voltage of the power supply unit 127 and a predetermined operating voltage range V1* of the power supply unit 127. In addition, the comparison means 129 of the supervision microcontroller 120 are also configured to perform a comparison between a measurement of the operating voltage of the power supply unit 117 and a predetermined operating voltage range V2* of the power supply unit 117. In this layout, the predetermined operating voltage range V1* of the power supply unit 127 is known to the main microcontroller 110 and may be stored in the memory 118. Furthermore, the predetermined operating voltage range V2* of the power supply unit 117 is known to the supervision microcontroller 120 and may be stored in the memory 128. With this layout, the results of the comparisons enable the main microcontroller 110 and the supervision microcontroller 120 to mutually detect a failure of the power supply unit of the other microcontroller. In particular, it is possible for a microcontroller to detect undervoltages and overvoltages of the power supply unit under surveillance.

Figure 4:
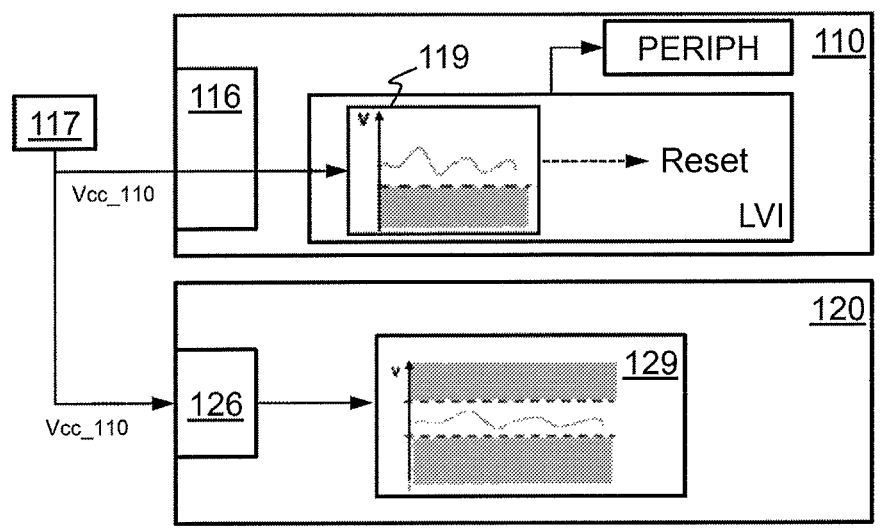
FIG. 4 is a schematic depiction of part of the circuit of FIG. 1, showing a power supply control mechanism.

FIG. 4 schematically shows part of the circuit 100 that relates to the previous embodiment. In the example of FIG. 4, the supervision microcontroller 120 measures a supply voltage Vcc_110 of the power supply unit 117 of the main microcontroller 110. Thereafter, the voltage measurement Vcc_110 is compared with the predetermined operating voltage range V2* of the power supply unit 117 (zone shown in light gray in FIG. 4). Thus, when the voltage measurement Vcc_110 is within the predetermined operating voltage range V2* of the power supply unit 117 (zone shown in white between the dashed lines in FIG. 4), then no failure of the power supply unit 117 is detected by the supervision microcontroller 120. By contrast, a failure of the power supply unit 117 will be detected by the supervision microcontroller 120 if the voltage measurement Vcc_110 is situated outside the predetermined operating voltage range V2* of the power supply unit 117. The layout of FIG. 4 may be added to in order to detect an undervoltage of the power supply unit 117. Knowing this information may be beneficial, as the voltage Vcc_110 may be used to supply a peripheral PERIPH of the main microcontroller 110. It is therefore beneficial to detect an undervoltage of the power supply unit 117 directly in the main microcontroller 110. To this end, it is possible to use a low voltage inhibition module of known type (LVI for low voltage inhibit) in the microcontroller. An undervoltage may be detected when the voltage measurement Vcc_110 is situated below the predetermined operating voltage range V2* of the power supply unit 117.

Returning to FIG. 1, according to another embodiment of the circuit 100, there is provision for an actuator interface 140 that is coupled to the main microcontroller 110 and to the supervision microcontroller 120. The actuator interface 140 is configured to send an actuation signal to an actuator 300. The actuator 300 is configured to be coupled to the circuit 100. In one example, the actuator 300 is an actuator for triggering the ABS system. In this example, the actuation signal may be generated in response to the reception, via a sensor interface 150, of a measurement from a collision sensor 200. Furthermore, there is provision for the main microcontroller 110 and the supervision microcontroller 120 to each independently comprise an analog-to-digital converter (ADC) 116, 126. Each ADC 116, 126 is configured to receive and convert one and the same analog actuation signal coming from the actuator interface 140. In a first layout, the comparison means 129 of the supervision microcontroller 120 are furthermore configured to perform a comparison of one and the same physical signal between the digital conversion value from the ADC 116 of the main microcontroller 110 and the digital conversion value from the ADC 126 of the supervision microcontroller 120. In this layout, the digital conversion value from the ADC 116 of the supervision microcontroller 120 is sent to the main microcontroller 110 via the communication interface 130. With this layout, the result of the comparison allows the main microcontroller 110 to detect a failure of the ADC 116 of the main microcontroller 110 or of the ADC 126 of the supervision microcontroller 120. Specifically, if different digital conversion values are supplied by the ADCs of the two microcontrollers 110, 120, it may be deduced from this that at least one of the ADCs is defective. In a second layout, the comparison means 119 of the main microcontroller 110 are furthermore configured to perform a comparison between the digital conversion value from the ADC 126 of the supervision microcontroller 120 and the digital conversion value from the ADC 116 of the main microcontroller. Thereafter, a failure of at least one of the ADCs is able to be deduced from the comparison of the measurements gathered by the main microcontroller 110, as explained above with regard to the supervision microcontroller 120.

In one particular implementation of the previous embodiment, according to FIG. 1, there is provision for a switch unit 160 that is coupled between the actuator interface 140 and the actuator 300. The switch unit 160 is configured to alternate between a first state, in which the actuator interface 140 is able to communicate with the actuator 300, and a second state, in which the actuator interface 140 is not able to communicate with the actuator 300. Furthermore, the main microcontroller 110 is configured to send a signal to deactivate the circuit 100 to the switch unit 160, in response to the detection of a failure of the supervision microcontroller 120. In the same way, the supervision microcontroller 120 is configured to send another signal to deactivate the circuit 100 to the switch unit 160, in response to the detection of a failure of the main microcontroller 110. In this layout, the switch unit 160 is configured to change from the first state to the second state in response to the reception of a deactivation signal. With this layout, if a failure of at least one microcontroller 110, 120 is detected, it is proposed for the microcontroller detecting the failure to generate the deactivation signal for deactivating the circuit 100 by preventing the latter from sending actuation signals to the actuator 300.

Figure 5:
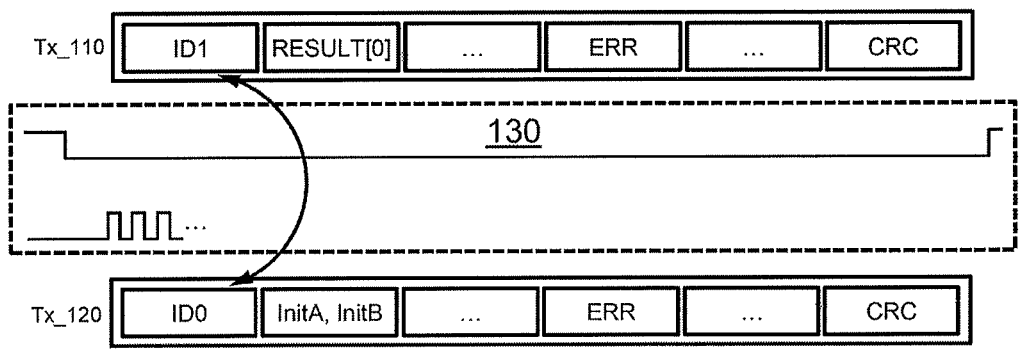
FIG. 5 is a schematic depiction of part of the circuit of FIG. 1, showing a mechanism for exchanging data between the main microcontroller and the secondary microcontroller, incorporating in particular a transmission control mechanism.

FIG. 5 schematically shows part of the circuit 100 according to one embodiment of an aspect of the invention. In the example of FIG. 5, it is possible to see a data frame Tx_110 sent by the main microcontroller 110 and a data frame Tx_120 sent by the supervision microcontroller 120. The frames Tx_110 and Tx_120 in the example of FIG. 5 are transmitted via the communication interface 130. According to the embodiment of FIG. 5, there is provision for the main microcontroller 110 and the supervision microcontroller 120 to each comprise means (not shown) for forming the data frames to be sent on the communication interface 130. The frame-forming means are designed to form data frames to be sent on the communication interface 130, but also to extract data from the frames received via the communication interface 130. Each of the frame-forming means are furthermore configured, in response to the reception of a frame, to insert a frame identifier into the frame to be sent. This insertion of an indicator depends on a frame identifier contained in the last frame received. With this layout, the comparison means 119 of the main microcontroller 110 are furthermore configured to perform a comparison between the identifier of the last frame transmitted by the supervision microcontroller 120 in response to a frame transmitted by the main microcontroller 110, and the identifier of the frame transmitted by the main microcontroller 110. The comparison means 129 of the supervision microcontroller 120 are configured in the same way so as to perform a comparison between the identifier of the frame transmitted by the main microcontroller 110 in response to a frame transmitted by the supervision microcontroller 120, and the identifier of the frame transmitted by the supervision microcontroller 120.

The example of FIG. 5 shows the identifier $ID_0$ of the frame Tx_120 and the identifier $ID_1$ of the frame Tx_110. In this example, the identifier $ID_0$ corresponds to a numerical value incremented by 1 by the main microcontroller 110 upon each frame transmission, whereas the identifier $ID_1$ corresponds to a numerical value incremented by 1 by the supervision microcontroller 120 upon each frame transmission. Generally speaking, the identifiers $ID_0$ and $ID_1$ are synchronized such that the microcontroller receiving a frame identifier is able to check that this identifier is indeed linked to the identifier generated by this same microcontroller during the transmission of the previous frame. This principle makes it possible to ensure that no frame is "lost" and that the two microcontrollers are able to communicate with one another.

Furthermore, in FIG. 5, the frame Tx_120 contains the initialization values InitA and initB and the frame tx_110 contains the result RESULT[0] of the polynomial calculation performed by the two cores 111 and 112 of the main microcontroller 110, as described above. The frames Tx_110 and Tx_120 may also contain an indication ERR of the detection of a failure. In addition, a cyclic redundancy check CRC may be included in each frame Tx_110 and Tx_120 in order to check that the integrity of the frame has been correctly complied with during transmission.

Aspects of the invention have a number of advantages. Specifically, by virtue of all of the mechanisms disclosed above, it is possible to detect failures of a dual-core microcontroller, and to do so in order to comply with the ISO 26 262 standard.

Aspects of the present invention have been described and illustrated in the present detailed description and in the figures of the appended drawings. The aspects of the present invention are not limited to the embodiments thus presented, however. Other variants and embodiments may be deduced and implemented by a person skilled in the art after reading the present description and the appended drawings.

Also contemplated is a motor vehicle electronic computer (ECU) for detecting faults with at least one critical function of a motor vehicle and that includes a detection circuit such as described above, from among the various embodiments of the invention taken alone or in combination.

Lastly, also contemplated is a motor vehicle comprising one or more ECUs according to an aspect of the invention.

In the claims, the term "include" does not exclude other elements or other steps. The indefinite article "a" or "an" does not exclude the plural. The various features described and/or claimed may advantageously be combined. Their presence in the description or in different dependent claims does not exclude this possibility. Lastly, the reference signs in the figures of the drawings should not be understood as limiting the scope of aspects of the invention.

The invention claimed is:

1. A failure detection circuit for a motor vehicle electronic computer, the circuit comprising:
   a main microcontroller comprising:
      at least two microcontroller cores configured to execute the same instructions in parallel, and at least one first software module including source code, the at least one first software module providing a critical function of a motor vehicle, the first software module comprising a predetermined input point in the source code indicating a start of execution of the at least one first software module and a predetermined output point in the source code indicating an end of execution of the at least one first software module, a supervision microcontroller; and a synchronous communication interface for coupling the main microcontroller and the supervision microcontroller so as to enable mutual supervision, wherein the supervision microcontroller is configured to supply the main microcontroller with a first initialization value and a second initialization value, wherein the main microcontroller is configured, in response to the execution of the first software module, to:

determine a first input point value at the predetermined input point of the first software module, by performing a first computation based on the first initialization value and an execution start value indicative of a start of execution of a software module of the main microcontroller, the execution start value is predetermined and known by both the main microcontroller and the supervision microcontroller, determine a first output point value at the predetermined output point of the first software module, by performing a second computation based on the second initialization value and an execution end value and indicative of an end of execution of a software module of the main microcontroller, the execution end value is predetermined and known by both the main microcontroller and the supervision microcontroller, determine a first result value of a predetermined calculation by performing a third computation based on the first input point value and the first output point value, and supply the supervision microcontroller with the first result value, and wherein the supervision microcontroller is equipped with a comparison device for performing a first comparison between the first result value and a predetermined first result value known by the supervision microcontroller, such that the supervision microcontroller is able to detect a failure of the main microcontroller in response to the first comparison indicating that the first result value does not match the predetermined first result value.

2. The detection circuit as claimed in claim 1, wherein the predetermined calculation is an at least second-order polynomial calculation.

3. The detection circuit as claimed in claim 1, wherein:

the main microcontroller comprises a second software module providing a critical function of the motor vehicle, the second software module comprising a predetermined input point and a predetermined output point, the main microcontroller is furthermore configured, in response to the execution of the second software module, to:

determine a second input point value at the predetermined input point of the second software module, on the basis of the first input point value and of the execution start value;

determine a second output point value at the predetermined output point of the second software module, on the basis of the first output point value and of the execution end value;

determine a second result value of the predetermined calculation on the basis of the second input point value and of the second output point value; and supply the supervision microcontroller with the second result value;

the comparison means of the supervision microcontroller are furthermore configured to perform a second comparison between the second result value and a predetermined second result value of the predetermined calculation, such that the supervision microcontroller is able to detect a failure of the main microcontroller in response to the second comparison.

4. The detection circuit as claimed in claim 1, wherein:

the supervision microcontroller is equipped with measurement means for measuring a time that has elapsed between the supplying of the main microcontroller with the first and second initialization values and the reception of a result value, and the comparison means of the supervision microcontroller are furthermore configured to perform a third comparison between the OUTWARD-RETURN time and a predetermined OUTWARD-RETURN time, such that the supervision microcontroller is able to detect a failure of the main microcontroller in response to the third comparison.

5. The detection circuit as claimed in claim 1, wherein:

the main microcontroller is equipped with measurement means for measuring an execution period of one or of several software modules of the main microcontroller, and the comparison means of the supervision microcontroller are furthermore configured to perform a fourth comparison between the measurement of the execution period transmitted to the supervision microcontroller and a predetermined execution period, such that the supervision microcontroller is able to detect a failure of the main microcontroller in response to the fourth comparison.

6. The detection circuit as claimed in claim 1, wherein:

the main microcontroller and the supervision microcontroller each independently comprise an operating clock, the supervision microcontroller is furthermore equipped with clock generation means for generating an operating clock of the communication interface on the basis of the operating clock and of a predetermined operating clock value, and the main microcontroller is furthermore equipped:

with measurement means for measuring the clock of the communication interface, and with comparison means for performing a fifth comparison between a measurement of the operating clock of the communication interface by the measurement means and the predetermined operating clock value, such that the main microcontroller is able to detect a failure of the supervision microcontroller in response to the fifth comparison.

7. The detection circuit as claimed in claim 6, wherein:

the main microcontroller is furthermore equipped with means for periodically generating an initialization signal indicative of the initialization of communication via the communication interface on the basis of a predetermined periodicity value, and the supervision microcontroller is furthermore equipped with measurement means for measuring the periodicity of the initialization signal, the comparison means of the supervision microcontroller are furthermore configured to perform a sixth comparison between a measurement of the periodicity of the reception of the initialization signal by the measurement means and the predetermined periodicity value, such that the supervision microcontroller is able to detect a failure of the main microcontroller in response to the sixth comparison.

8. The detection circuit as claimed in claim 1, wherein:
the main microcontroller comprises a first power supply unit and the supervision microcontroller comprises a second power supply unit, the first and the second power supply units are physically independent from one another,
the main microcontroller and the supervision microcontroller each independently comprise voltage measurement means,
the main microcontroller is coupled to the second power supply unit and the comparison means of the main microcontroller are furthermore configured to perform a seventh comparison between a measurement of the operating voltage of the second power supply unit by the measurement means and a predetermined first operating voltage range, such that the main microcontroller is able to detect a failure of the supervision microcontroller in response to the seventh comparison, and
the supervision microcontroller is coupled to the first power supply unit and the comparison means of the supervision microcontroller are furthermore configured to perform an eighth comparison between a measurement of the operating voltage of the first power supply unit by the measurement means and a predetermined second operating voltage range, such that the supervision microcontroller is able to detect a failure of the main microcontroller in response to the eighth comparison.

9. The detection circuit as claimed in claim 1, wherein:
an actuator interface is coupled to the main microcontroller and to the supervision microcontroller, the actuator interface is configured to send an actuation signal to an actuator intended to be connected to the detection circuit,
the main microcontroller and the supervision microcontroller each independently comprise an analog-to-digital converter configured to receive the same actuation signal, and
the comparison means of the supervision microcontroller are furthermore configured to perform a ninth comparison between the digital conversion values obtained from the analog-to-digital converter of the main microcontroller and the digital conversion value from the analog-to-digital converter of the supervision microcontroller, such that the supervision microcontroller is able to detect a failure of the main microcontroller in response to the ninth comparison.

10. A motor vehicle electronic computer for detecting failures of at least one critical function of a motor vehicle, characterized in that it comprises a detection circuit as claimed in claim 1, coupled to a sensor and to an actuator for a critical function of the vehicle.

11. The detection circuit as claimed in claim 2, wherein:
the main microcontroller comprises a second software module providing a critical function of the motor vehicle, the second software module comprising a predetermined input point and a predetermined output point, the main microcontroller is furthermore configured, in response to the execution of the second software module, to:
  determine a second input point value at the predetermined input point of the second software module, on the basis of the first input point value and of the execution start value;
  determine a second output point value at the predetermined output point of the second software module, on the basis of the first output point value and of the execution end value;
  determine a second result value of the predetermined calculation on the basis of the second input point value and of the second output point value; and
  supply the supervision microcontroller with the second result value;
the comparison device of the supervision microcontroller is furthermore configured to perform a second comparison between the second result value and a predetermined second result value of the predetermined calculation, such that the supervision microcontroller is able to detect a failure of the main microcontroller in response to the second comparison.

12. The detection circuit as claimed in claim 1, wherein the supervision microcontroller is further configured to identify a location in the first software module where a given failure has occurred, when first result value is an intermediate value of the first software module and the first result value does not match the predetermined first result value.

* * * * *